United States Patent [19]

Hoag

[11] Patent Number: 4,534,032
[45] Date of Patent: Aug. 6, 1985

[54] APPARATUS FOR ESTABLISHING AND MAINTAINING A STABLE ELECTRICAL DISCHARGE ACROSS A STREAM OF GAS, AND A HIGH-POWER LASER INCLUDING SUCH APPARATUS

[75] Inventor: Ethan D. Hoag, Boston, Mass.

[73] Assignee: Metalworking Lasers International Ltd., Neve Sharett, Ill.X

[21] Appl. No.: 431,254

[22] Filed: Sep. 30, 1982

[51] Int. Cl.³ ............................................. H01S 3/04
[52] U.S. Cl. ....................................... 372/34; 372/87; 372/83; 313/231.61; 313/40
[58] Field of Search ................... 372/87, 55, 34, 36, 372/83, 28; 313/231.61, 28, 40

[56] References Cited

U.S. PATENT DOCUMENTS 4,288,758  9/1981  Seguin et al. ........................ 372/87
4,423,510 12/1983  Pack et al. ........................... 372/87

Primary Examiner—William L. Sikes
Assistant Examiner—Léon Scott
Attorney, Agent, or Firm—Benjamin J. Barish

[57] ABSTRACT

Apparatus for establishing and maintaining a stable electrical discharge across a stream of gas flowing through a gas flow channel, particularly useful in high-power lasers, comprises a plurality of modular elements each including a plurality of electrodes, a ballast impedance for each electrode, and a cooling element for each electrode in thermal communication with the electrode and its ballast impedance, all embedded within a block of insulating material. The ballast impedances for the electrodes at the downstream side of the gas flow channel have lower impedance values than those for the electrodes at the upstream side of the channel so as to compensate for the lower impedance of the gas flowing through the channel at the downstream side and to produce a substantially constant voltage across the various portions of the channels.

33 Claims, 7 Drawing Figures

APPARATUS FOR ESTABLISHING AND MAINTAINING A STABLE ELECTRICAL DISCHARGE ACROSS A STREAM OF GAS, AND A HIGH-POWER LASER INCLUDING SUCH APPARATUS

RELATED APPLICATIONS

The present application is related to pending applications Ser. No. 410,594 filed Aug. 23, 1982, now U.S. Pat. No. 4,486,887 of Dec. 4, 1984 by Ethan D. Hoag and Glen W. Zeiders; Ser. No. 431,014 filed Sept. 30, 1982 by Ethan D. Hoag; Ser. No. 431,242 filed Sept. 30, 1982 by Jacob Daniel; and Ser. No. 431,253 filed Sept. 30, 1982 by all assigned to the same assignee as the present application.

BACKGROUND OF THE INVENTION

The present invention relates to apparatus for establishing and maintaining a stable discharge across a stream of gas flowing through a gas-flow channel. The invention is particularly applicable to high-power flowing-gas lasers, and is therefore described below with respect to such application.

There has been considerable activity in recent years to produce high-power flowing-gas lasers for use particularly in the metalworking industries. Examples of some of the known lasers of this type are described in U.S. Pat Nos. 3,641,457; 3,702,973; 3,748,594; 3,758,874; 3,886,481; 3,021,098; 4,058,778; 4,317,090; and 4,321,558. One of the main problems in the design of such high-power lasers is the dissipation of the heat, since power lasers cannot operate efficiently at unduly high temperatures; for example, the $CO_2$ laser, which is the one mainly used today for high power applications, cannot operate efficiently at temperatures much above 200° C. Another problem in the design of high-power lasers is the difficulty in establishing and maintaining a stable electrical discharge across the stream of flowing gas. U.S. Pat. Nos. 3,748,594 and 3,758,874 of those cited above are particularly directed to this problem. It will be appreciated that both of the above problems involved in the construction of high-power flowing-gas lasers are also involved in the design and construction of other high-power flowing-gas electrical devices.

BRIEF SUMMARY OF THE INVENTION

An object of the present invention is to provide improved apparatus for establishing and maintaining a stable electrical discharge across a stream of gas flowing through a gas-flow channel. Another object of the invention is to provide such apparatus which not only enables improvements to be made in the heat-dissipation and in the stable-electrical-discharge problems mentioned above, but which also facilitates construction and maintenance of the apparatus. Another object of the invention is to provide high-power flowing-gas lasers of improved construction in the above respects.

According to a broad aspect of the present invention, there is provided apparatus for establishing and maintaining a stable electrical discharge across a stream of gas flowing through a gas flow channel, characterized in that at least a portion of the wall of the gas flow channel is occupied by a plurality of structural elements each including at least one electrode having means for connecting said electrodes to an external source of electrical power, and a cooling element in thermal communication with said electrode, the electrodes and cooling element being embedded within a block of insulating material extending along the respective portion of the wall of the gas flow channel.

In the preferred embodiments of the invention described below, the structural elements are modular elements, i.e., components of uniform structure used repeatedly. Each includes a plurality of electrodes arranged in a line with respect to the gas flow channel. In one described embodiment, the line of electrodes in each modular element extends parallel to the flow of gas through the channel; and in a second described embodiment, each modular element extends transversely to the flow of gas through the channel. In both described embodiments, each of the modular elements includes a ballast impedance electrically connected to each electrode and embedded within the block of insulating material.

According to another important feature of the present invention, the ballast impedances in the modular elements at the downstream side of the gas flow channel have lower impedance values than those in the modular elements at the upstream side so as to compensate for the lower impedance of the gas flowing through the channel at the downstream side and to produce a substantially constant voltage across the various portions of the channel.

In both of the above-mentioned embodiments of the invention as described below, each of the electrodes includes a metal pin projecting from the inner face of the modular element and protruding into the gas-flow channel. A third embodiment of the invention is also described below wherein each electrode of the modular elements is a planar layer extending substantially parallel to the inner face of the gas flow channel, each modular element further including a layer of dielectric material over said planar electrode, which layer of dielectric material constitutes the inner face of the modular element at the respective portion of the gas flow channel, and also serves as the dielectric of the ballast impedance for the respective electrode.

Further features and advantages of the invention will be apparent from the description below.

BRIEF DESCRIPTION OF THE DRAWINGS

The invention as herein described, by way of example only, with reference to the accompanying drawings, wherein.

DESCRIPTION OF PREFERRED EMBODIMENTS

Figure 1:
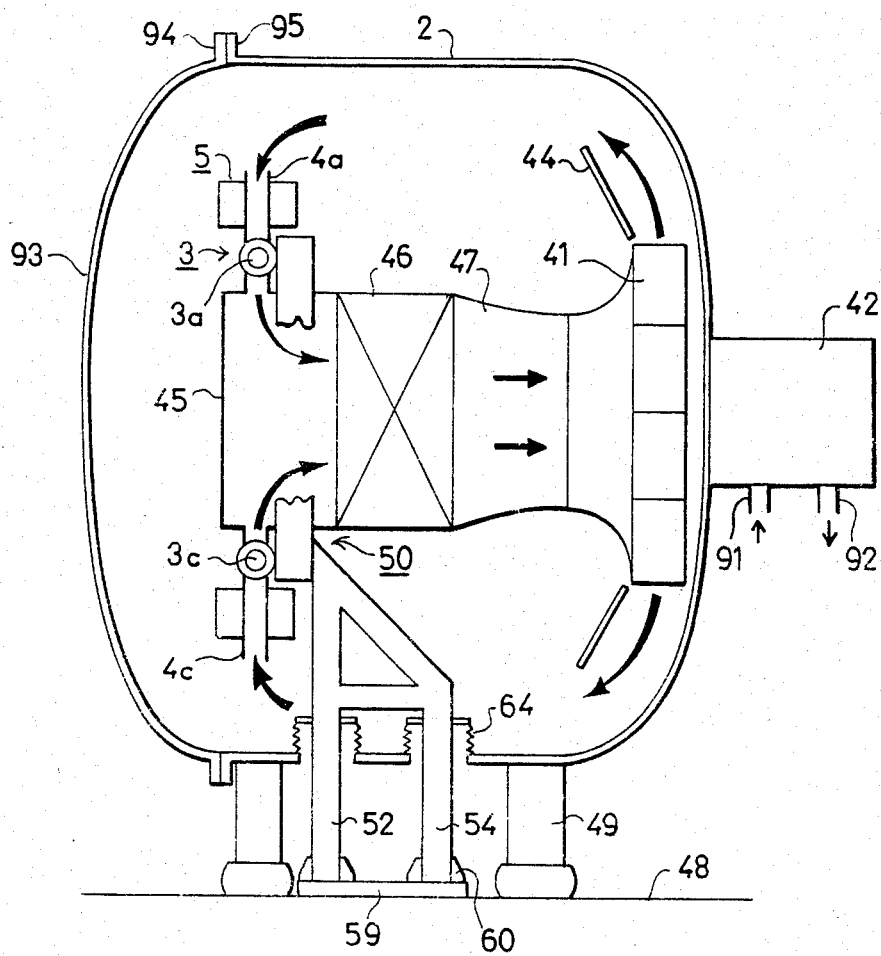
FIG. 1 illustrates one form of high-power flowing-gas laser in which the invention is particularly useful.

General Laser Construction (FIG. 1)

With reference to FIG. 1, there is illustrated a high-power flowing-gas laser including an outer housing 2 capable of withstanding an internal pressure which is different from atmospheric. In this type of laser, the pressure is below about 0.2 atmospheres. The preferred pressure for the arrangement illustrated, particularly for the type of electric discharge to be used for exciting the laser gas, is about 0.05 atmospheres. The gas is preferably one of the known $CO_2$ mixtures commonly used in high-power lasers.

The laser channel is in the form of an optical cavity or resonator, generally designated 3, folded so as to be constituted of four legs arranged in a square configuration. Two of the legs are shown at 3a and 3c in FIG. 1, the overall construction of the optical cavity being more particularly described in copending Patent Applications Ser. Nos. 410,594 and 431,014. Each leg is served by a separate gas flow channel, e.g. 4a, 4c, through which a gas flow is produced by means of an impeller 41 driven by an electric motor 42, the output end of impeller 41 being provided with a diffuser 44.

The gas in each channel flows transversely through the respective legs (3a, 3c) of the folded laser channel, but first the gas is excited by an electrical discharge system, generally designated 5 and to be described more particularly below, provided upstream of each laser channel leg. As the gas flows transversely across the laser channel legs (e.g. 3a, 3c), it is heated by the electrical discharge so that the gas exiting from the channels is at a substantially higher temperature than the gas entering them. The heated gas is directed by a wall 45 to flow through a heat exchanger 46 and then via a conduit 47 to the input of impeller 41 for recirculation through the gas flow channels.

As more particularly described in copending Patent Application Ser. No. 431,014, the mirrors comprising the optical system 3 are supported on the factory floor 49 by an independent mounting, generally designated 50, which is separate and apart from the housing mounting 49, such as to isolate the optical system from the vibrational disturbances produced by the impeller 41 and the motor drive 42. This independent mounting 50 includes a temperature-stabilized mild steel frame supported on legs (e.g. 52, 54) each of which protrudes out of the vacuum chamber in housing 2 through a flexible lead-through 64, such as an elastomeric boot or a metal bellows, to a heavy base 59 beneath the chamber. The chamber, including the impeller and its drive, is isolated from the factory floor 48 by vibrational isolator mounts. For stabilization purposes, the lower ends of the legs are provided with radially-extending webs 60. This arrangement isolates the optical components from the major vibration source (namely, the impeller and its drive), while allowing the laser beam source (i.e., the optical resonator) to be positively referenced to the factory floor.

Motor 42, driving the impeller 41, is mounted on one end wall of the housing 2, and is cooled by water inletted at 91 and outletted at 92. End wall 93 at the opposite end of the housing 2 is removable in order to provide convenient access into the interior of the housing. For this purpose, end wall 93 is formed with an annular flange 94 removably fastened to annular flange 95 of the housing.

Figure 2:
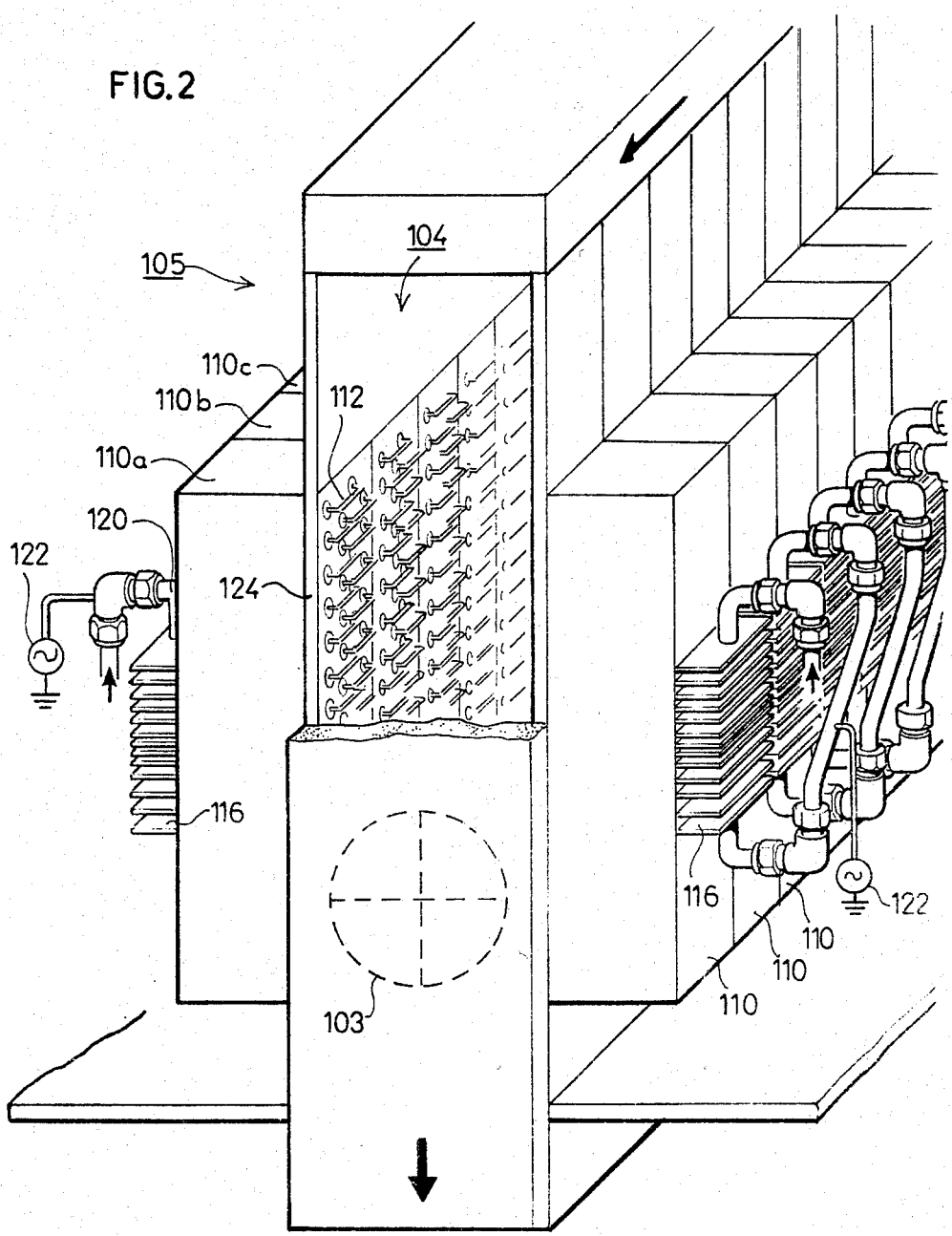
FIG. 2 is an enlarged three-dimensional view illustrating one construction of each of the gas-flow channels in the laser of FIG. 1.
Figure 3:
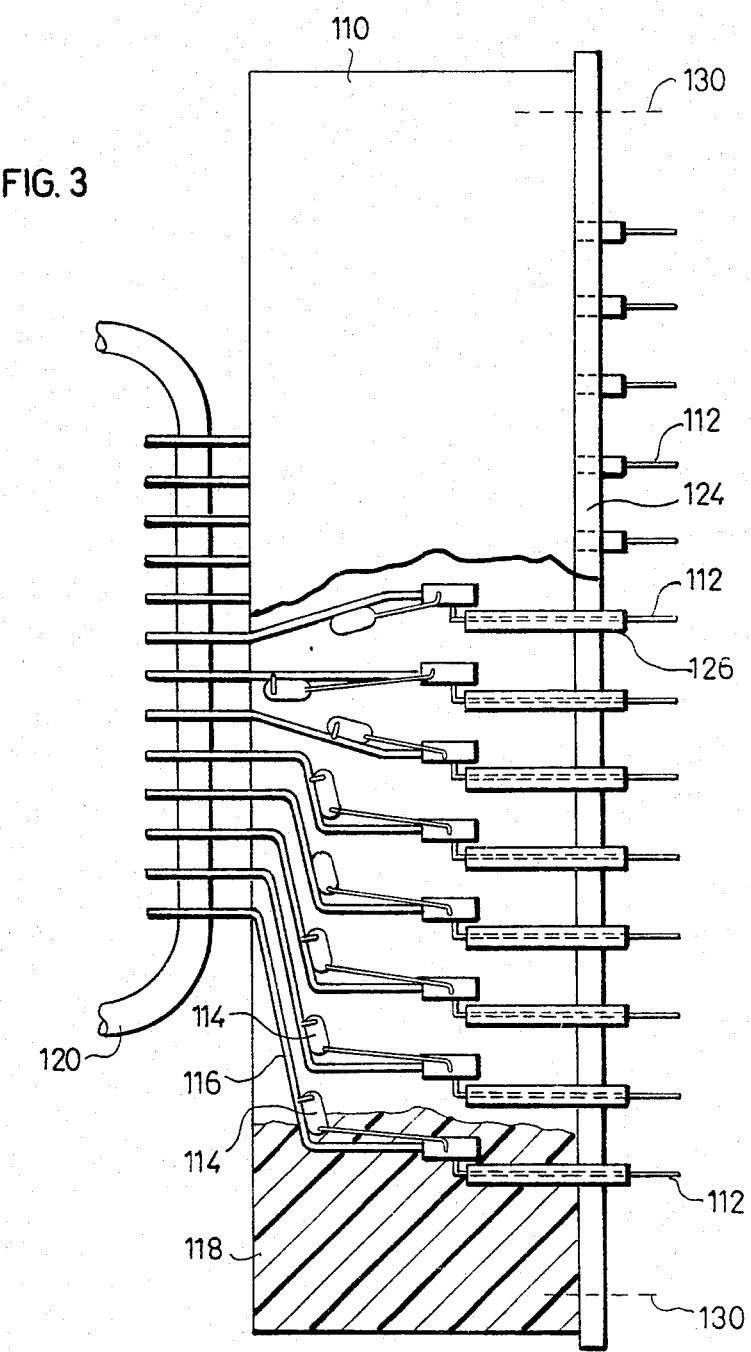
FIG. 3 is a partially-broken view illustrating the construction of one of the modules in the gas-flow channel of FIG. 2.
Figure 4:
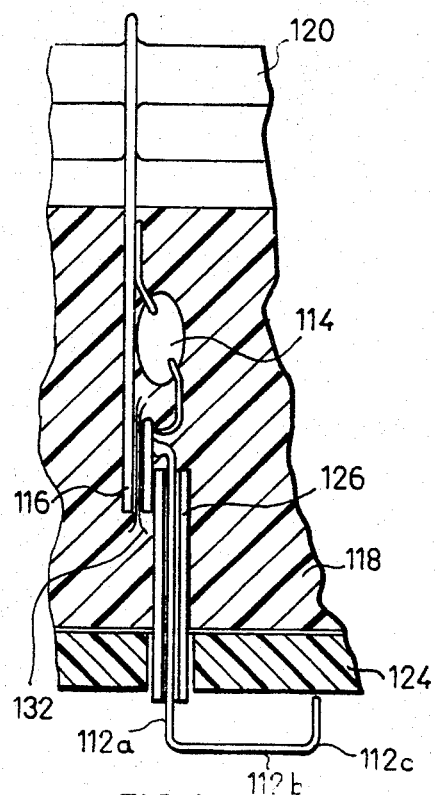
FIG. 4 is an enlarged view more particularly illustrating the elements associated with one electrode in the module of FIG. 3.
Figure 5:
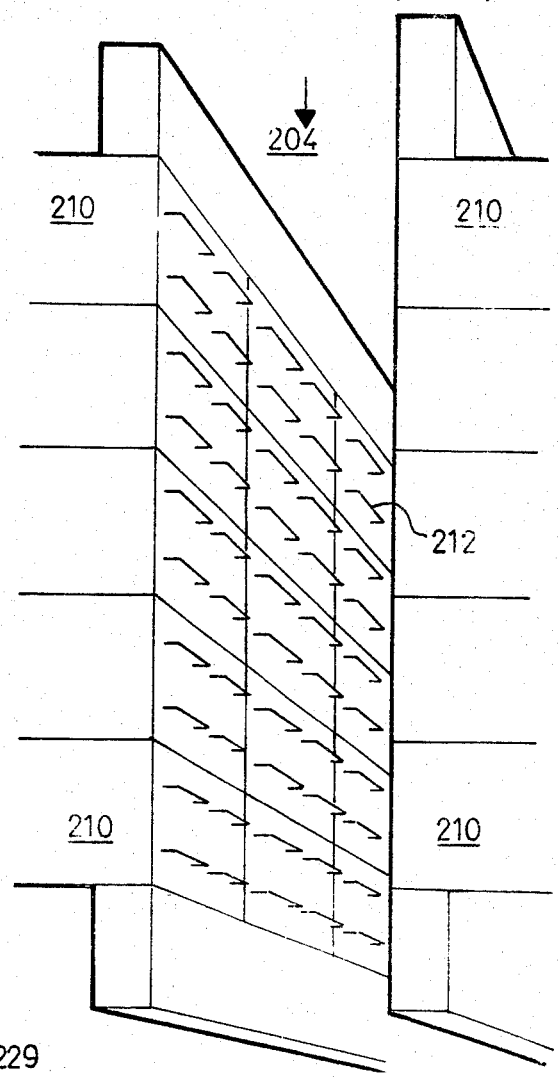
FIG. 5 is a three-dimensional view illustrating a second construction of each of the gas-flow channels in the laser of FIG. 1.
Figure 6:
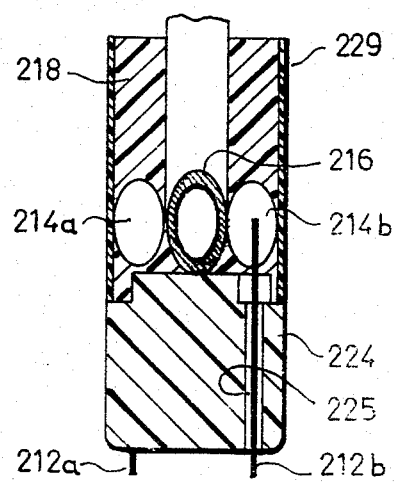
FIG. 6 is an enlarged sectional view illustrating the elements associated with each of the electrodes in each of the modules of FIG. 5.
Figure 7:
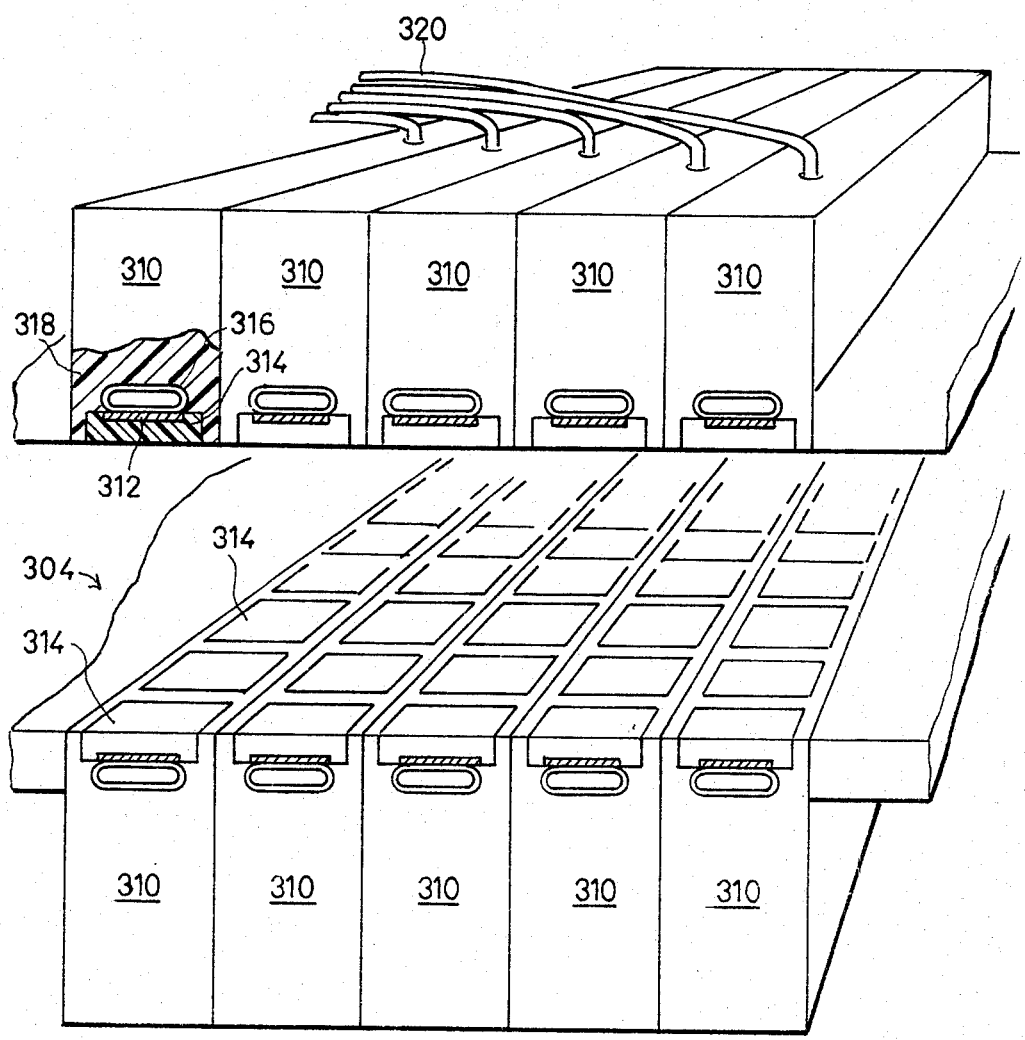
FIG. 7 illustrates a third construction of each of the gas-flow channels in the laser of FIG. 1.

The electrical discharge system 5 for each of the gas flow channels is of the high-frequency type including segmented electrodes and ballasting. Each such discharge system 5 is constituted of a plurality of modular elements including electrodes adapted to be connected to an external source of electrical power, a ballast impedance electrically connected to each electrode, and cooling elements in thermal communication with the electrodes and with the ballast impedances, all of which are embedded within a block of insulating material extending along the respective portion of the gas flow channel wall. FIGS. 2-4 illustrate one modular construction, FIGS. 5-6 illustrate a second modular construction, and FIG. 7 illustrates a third modular construction, which may be used for each of the electrical discharge systems 5 and the respective gas flow channel (e.g. 4a) illustrated in the laser of FIG. 1.

Electrical Discharge System Structure of FIGS. 2-4

The electrical discharge structure of FIGS. 2-4, therein generally designated 105, comprises a plurality of modular elements 110 along each of the two opposite sides of the respective gas flow channel 104 for the respective laser channel leg 103. As shown particularly in FIG. 3, each module 110 includes a plurality of electrodes 112; a ballast impedance 114, which in this case is a capacitor, for each of the electrodes 112; a cooling element 116, which in this case is a cooling fin, in thermal communication with each electrode and ballast capacitor; and a block of insulating material 118 embedding all the electrodes 112, capacitors 114 and cooling fins 116 of the respective module. All the modules 110 are disposed in side-side relationship transversely of the respective gas flow channel 104 with all the electrodes of each model disposed in staggered lines extending parallel to the flow of gas through the channel. The cooling fins 116 of each module extend through the outer face of the respective module, i.e., through the face distant from that of the gas flow channel 104; and a cooling tube 120 is passed through openings in the extensions 116' of all the cooling fins of the respective module for removing the heat generated within the module.

The electrodes 112 of each module are energized by a high-voltage, high-frequency source 122 connected to the external cooling tubes 120, as shown in FIG. 2. Such cooling tubes may be made of copper to provide good electrical conductivity to all the electrodes 112 of the respective module via their cooling fins 116. The ballast capacitors 114 are connected between the cooling fins 116 and their respective electrodes 112, and both the capacitors and the electrodes are located in good thermal communication with the cooling fins 116 so as to facilitate the removal of the heat generated within the modules via the cooling fiins and the cooling tubes 120.

Each of the two opposed walls of the gas flow channel 104 occupied by the modular elements 110 includes a sheet 124 of heat-resistant insulating material, such as ceramic, lining the inner face of the gas flow channel 104. Each sheet 124 is used for mounting all the modular elements 110a, etc. for the respective side of the channel, and for this purpose, it is formed with a plurality of openings through which the electrodes 112 of the modular elements 110 are passed when the modular elements are mounted to the sheet.

As shown particularly in FIGS. 3 and 4, each of the electrodes 112 includes a ceramic sleeve 126 which is partially embedded in the insulating material 118 of the modular element and which extends, with the electrodes 112, through the heat-resistant sheet 124 lining the inner face of the modules. Each electrode 112 includes a straight portion 112a extending through sheet 124 to protrude into the gas flow channel whereupon its tip is bent to form a leg 112b extending transversely to the direction of the gas flow through the channel. The extreme tip 112c of each electrode is then bent inwardly towards sheet 124 and terminates just short of contact with it.

In assembling the modular elements to the heat-resistant sheet 124, the electrodes 112, including their ceramic sleeves 126, are passed through the openings in the sheet, and the electrodes are then bent to form their transversely-extending legs 112b and inwardly-extending tips 112c, after the modular elements have been assembled to the sheets 124. The modular elements along each side of the channel are then secured to their respective heat-resistant sheet 124 by any suitable means, such as fasteners 130 (FIG. 3). The cooling tubes 120 for the modules on each side of the gas flow channel 104 are connected in series.

Each of the cooling fins 116 is preferably of copper having a low thermal resistance, whereas each of the electrodes 112 is of high thermal resistance material, such as stainless steel wire. The juncture of each ballast capacitor 114 with its respective electrode 112 is insulated by a thin insulating film 132 (FIG. 4) also of relatively low thermal resistance material. This arrangement provides a relatively low thermal-resistance pathway from the electrodes 112 and their ballast capacitors 114 to the external cooling tubes 120 via the cooling fins 116, and a relatively high thermal-resistance pathway to the portions of the electrodes 112 protruding within the gas flow channel 104, thereby preventing overheating of the electrodes within the channel.

The electrical discharge system illustrated in FIGS. 2–4 for each of the gas flow channels in the laser of FIG. 1 provides an efficient means for dissipating the heat generated by the electrodes and for preventing their overheating. The described arrangement including the segmentized ballasted electrodes also provides an efficient means for establishing and maintaining a stable electrical discharge across the stream of gas flowing through each of the gas flowing channels. Moreover, this arrangement, wherein the electrodes, their ballast capacitors, and their cooling elements are all embedded within blocks of insulating material forming modular elements, facilitates the construction of the electrical discharge system for each laser channel leg, and also facilitates its maintenance and repair by replacing individual modules whenever necessary.

As one example, the construction illustrated in FIGS. 2–4 may include 19 modules 110 along each of the two opposed walls of each of the gas flow channels 104; and each module may include 13 electrodes 112 arranged in two staggered lines, with each electrode provided with a ballast capacitor 114 and a cooling fin 116 as described above. The potting compound 118 for embedding the electrodes 112, ballast capacitors 114 and cooling fins 116 may be an epoxy resin.

Preferably, the ballast capacitors 114 at the downstream side of the gas flow channel 4 have lower impedance values than those at the upstream side of the channel, so as to compensate for the lower impedance of the gas flowing through the channel at the downstream side, and to produce a substantially constant voltage across the various portions of the channel. As one example, the ballast capacitors 114 at the upstream side (top in FIG. 2) of the gas flow channel 104 could have values of 300 pF; those at the downstream side could have values of 700 pF; and those in the intermediate modules could have values of 500 pF.

Electrical Discharge System Structure of FIGS. 5 and 6

FIGS. 5 and 6 illustrate a second embodiment of the invention, wherein the modular elements, therein designated 210, are also in side-by-side relationship but extend axially of the gas flow channel, therein designated 204, rather than transversely of the gas-flow channel as in FIGS. 2–4. In the arrangement illustrated in FIGS. 5 and 6, only five such modular elements 210 are provided, instead of the 19 modular elements illustrated in FIGS. 2–4. As will be seen in FIG. 5, each modular element 210 also includes two lines of electrodes 212, as in FIGS. 2–4, except that in FIGS. 5 and 6 each line of electrodes extends transversely to the flow of gas through the channel 204, rather than parallel to the flow of gas through the channel as in the FIGS. 2–4 arrangement.

One of the important advantages in the FIGS. 5 and 6 arrangement is that it more conveniently permits providing the ballast capacitors 214 (FIG. 6) at the downstream side of the gas flow channel to have lower impedance values than those at the upstream side of the channel so as to produce a substantially constant voltage across the various portions of the channel, as described above. Thus, modular elements 210 at the upstream side (top, FIG. 5) of the gas flow channel 204 may be constructed with ballast capacitors of higher impedance than those in the modular elements 110 at the downstream side of the channel.

Another feature included in the electrical discharge system structure of FIGS. 5 and 6 is that the cooling elements included within the modular elements 210 are in the form of water-conducting tubes, as shown at 216, rather than cooling fins 116. These cooling tubes 216 are also embedded within the plastic material 218 of the modular element and permit a higher rate of heat extraction than the cooling fins of the FIGS. 2–4 embodiment.

A still further difference in the construction illustrated in FIGS. 5 and 6 is that the insulating inner face sheet (124 of the FIGS. 2–4 embodiment) is omitted, the inner faces of the modular elements constituting the respective portions of the wall of the gas flow chamber 204 occupied by the modular elements.

Thus, as illustrated particularly in FIG. 6, the pin electrodes are arranged in two lines in each module, which lines are preferably staggered as shown by the two electrodes 212a and 212b. Also, there is one ballast capacitor for each electrode, as shown by capacitor 214a for electrode 212a, and ballast capacitor 214b for electrode 212b. Each modular element further includes one water conducting tube 216 extending between the two lines of ballast capacitors and in thermal contact with both. The water conducting tubes 216 may be made of copper, and serve also as the high-voltage connection to the electrodes in the respective module.

The electrodes, ballast capacitors, and water-cooling tubes 216 of each module 210 are all embedded within an epoxy potting material 218, as in the FIGS. 204 embodiment, except that the inner face of each module is also provided with a ceramic block 224 formed with openings 225 through which the electrodes pass so as to protrude within the gas flow channel. An insulating mold 224 is used for applying the epoxy potting material 218 to the ceramic block, which mold is retained and serves as a liner 224 for the module. The tips of the electrodes within the gas flow channel are also formed with legs extending transversely to the direction of the gas flow through the channel, as in the FIGS. 2-4 embodiment, and as shown particularly in FIG. 5. Since the inner face of each module is provided with the ceramic block 224, it is not necessary to include a ceramic sleeve around each pin electrode, as in the FIGS. 2-4 embodiment, but it is desirable that the openings 225 within the ceramic blocks for the electrodes be of slightly larger diameter than the outer diameter of the electrodes so as to provide some air space or clearance between the two.

Electrode Discharge System Structure of FIG. 7

FIG. 7 illustrates a further embodiment of the invention, wherein each electrode of the modular element, therein generally designated 310, is a planar metal layer 312 extending substantially parallel to the inner face of the gas flow channel, therein designated 304. Each modular element further includes a layer of a dielectric material 314 which constitutes the inner face of the modular element at the respective portion of the gas flow channel 304, and also serves as the dielectric of the ballast capacitor for the respective electrode.

As shown in FIG. 7, each of the modular elements 312 thus includes a line of the planar electrodes 312 and dielectric layers 314 extending transversely across the gas flow channel 304, so that there is formed the electrical equivalent of a line of electrodes each provided with a ballast capacitor. Each modular element further includes a water-conducting tube 316 extending along the length of the modular element and in contact with the inner faces of its line of planar electrodes 312. The water-conducting tubes 316 may also be used, as in the previously-described embodiments, for making the high-voltage electrical connections to the planar electrodes, as shown by the electrical conductors 320. All the foregoing elements in each module may be embedded with an epoxy resin 318 as in the previously described embodiments.

The dielectric layers 314 may be, for example, a ferroelectric ceramic material, such as barium titanate. These layers may be of different thicknesses in the different modules so as to provide a lower impedance value to the modular element 310 at the upstream side of the gas flow channel in order to produce a substantially constant voltage across the various portions of the channel, as in the two previously described embodiments.

As one example, the electrodes in all the above-described embodiments may be connected to a 150 kW, 2000 volt (RMS), 10 kHz power supply.

While the invention has been described with respect to several preferred embodiments, it will be appreciated that many other variations, modifications and applications of the invention may be made.

What is claimed is:

1. Apparatus for establishing and maintaining a stable electrical discharge across a stream of gas flowing through a gas flow channel, characterized in that at least a portion of the wall of said gas flow channel is occupied by a plurality of structural elements each including at least one electrode having means for connecting said electrode to an external source of electrical power, and a cooling element in thermal communication with said electrode, said electrode and cooling element being embedded within a block of insulating material extending along the respective portion of the wall of said gas flow channel.

2. Apparatus according to claim 1, wherein each of said structural elements includes a ballast impedance electrically connected to each electrode and embedded within said block of insulating material such that said ballast impediment is in thermal communication with said cooling element.

3. Apparatus according to claim 2, wherein the ballast impedances in the structural elements at the downstream side of the gas flow channel have lower impedance values than those in the structural elements at the upstream side so as to compensate for the lower impedance of the gas flowing through the channel at the downstream side and to produce a substantially constant voltage across the various portions of the channel.

4. Apparatus according to claim 1, wherein each of said structural elements includes a plurality of electrodes arranged in a line with respect to said gas flow channel.

5. Apparatus according to claim 4, wherein said line of electrodes in each structural element extends parallel to the flow of gas through the gas flow channel.

6. Apparatus according to claim 4, wherein said line of electrodes in each structural element extends transversely to the flow of gas through the gas flow channel.

7. Apparatus according to claim 4, wherein each of said electrodes includes a metal pin projecting from the inner face of the structural element so as to protrude into the gas flow channel and a ballast impedance connected to the electrode and embedded in the block of insulating material.

8. Apparatus according to claim 7, wherein the tip of each metal pin electrode protruding into the gas flow channel is formed with a leg extending transversely to the direction of the gas flow through the channel.

9. Apparatus according to claim 7, wherein said ballast impedance is a capacitor embedded in the block of insulating material.

10. Apparatus according to claim 7, wherein said cooling elements are cooling fins embedded in the block of insulating material, which cooling fins are thermally coupled to fluid-cooled tubes externally of the structural elements for dissipating the heat generated within the structural elements.

11. Apparatus according to claim 7, wherein said cooling elements are fluid-cooled tubes embedded within the blocks of insulating material.

12. Apparatus according to claim 7, wherein each of said structural elements is a modular element and includes a plurality of electrodes, ballast impedances, and cooling elements; and wherein said block of insulating material comprises an epoxy resin embedding the electrodes, ballast impedances, and cooling elements of the respective modular element.

13. Apparatus according to claim 12, wherein each block of insulating material includes a layer of a heat-resistant ceramic material on the face thereof through which the metal electrode pins project.

14. Apparatus according to claim 12, wherein each electrode element is enclosed within a heat-resistant ceramic sleeve.

15. Apparatus according to claim 7, further including a sheet of a heat-resistant insulating material lining the inner face of said plurality of structural elements and defining the respective portion of the wall of said gas flow channel, said sheet of insulating material being formed with openings through which said metal pin electrodes project so as to protrude into the gas flow channel.

16. Apparatus according to claim 7, wherein the inner face of each block of insulating material in said plurality of modular elements defines the respective portion of the wall of said gas flow channel.

17. Apparatus according to claim 1, wherein each of said modular elements includes a plurality of blocks bonded together as an integral unit, each block including a plurality of electrodes, ballast impedances, and cooling elements, there being a plurality of said structural elements on each of the two opposed sides of the gas flow channel.

18. Apparatus according to claim 17, wherein said layer of dielectric material is barium titanate.

19. Apparatus according to claim 17, wherein said planar electrode is in thermal contact with a fluid-cooled tube constituting the cooling element of the respective structural element.

20. Apparatus according to claim 19, wherein said planar electrodes of each structural element are disposed in a line extending transversely across said gas flow channel, the layers of dielectric material for the electrodes of each structural element being varied in thickness to impart to the electrodes of the structural element at the downstream side of the gas flow channel a lower impedance value than those of the structural element at the upstream side of the gas flow channel so as to compensate for the lower impedance of the gas flowing through the channel at the downstream side thereof and to produce a substantially constant voltage across the channel.

21. Apparatus according to claim 17, wherein said structural element includes a plurality of planar electrodes arranged in a line and each covered by a layer of dielectric material.

22. Apparatus according to claim 1, wherein each electrode of the structural elements is a planar layer extending substantially parallel to the inner face of the gas flow channel, each structural element further including a layer of dielectric material over said planar electrode, which layer of dielectric material constitutes the inner face of the structural element at the respective portion of the gas flow channel, and also serves as the dielectric of the ballast impedance for the respective electrode.

23. Apparatus according to claim 1, wherein said apparatus is a laser and includes a laser channel extending transversely across said gas flow channel downstream of said structural elements.

24. Apparatus for establishing and maintaining a stable discharge across a stream of gas flowing through a gas flow channel, characterised in that at least a portion of the wall of said gas flow channel is occupied by a plurality of structural elements each including a plurality of electrodes arranged in a line extending transversely to the flow of the gas flow channel, a plurality of ballast impedances for said electrodes, and insulating material embedding said electrodes and ballast impedances and extending along the respective portion of the inner face of the gas flow channel.

25. Apparatus according to claim 24, wherein said ballast impedances in the structural element at the downstream side of the gas flow channel have lower impedance values than those in the structural elements at the upstream side of the gas flow channel so as to compensate for the lower impedance of the flowing gas at the downstream side of the channel and to produce a substantially constant voltage across the various portions of the channel.

26. Apparatus according to claim 25, wherein said ballast impedance elements are capacitors.

27. Apparatus for establishing and maintaining a stable discharge across a stream of gas flowing through a gas flow channel, comprising a plurality of electrodes arranged in a plurality of lines each extending transversely across the gas flow channel, and a ballast impedance for each of said electrodes, the ballast impedances for the electrodes at the downstream side of the gas flow channel having lower impedance values than those for the electrodes at the upstream side of the gas flow channel to compensate for the lower impedance of the flowing gas at the downstream side of the channel and to produce a substantially constant voltage across the various portions of the channel.

28. Apparatus according to claim 27, wherein said electrodes are disposed in a plurality of structural elements, each such modular element also including insulating material embedding said electrodes and ballast impedances.

29. Apparatus according to claim 28, wherein each structural element further includes a cooling element embedded within said insulating material for dissipating the heat generated in said structural elements.

30. Apparatus according to claim 29, wherein each of said cooling elements is a fluid-conducting tube.

31. Apparatus according to claim 28, wherein each of said electrodes includes a metal pin projecting from the inner face of the structural element so as to protrude into the gas flow channel.

32. Apparatus according to claim 28, wherein each electrode of the structural elements includes a planar metal plate extending substantially parallel to the inner face of the gas flow channel, each structural element further including a layer of dielectric material over said planar metal plate, which layer of dielectric material constitutes the inner face of the structural element at the respective portion of the gas flow channel, and also serves as the ballast capacitor dielectric for the respective electrode.

33. Apparatus according to claim 27, wherein said apparatus is a laser and includes a laser channel extending transversely across said gas flow channel at the side thereof downstream of said electrodes.

* * * * *